United States Patent
Sato et al.

(10) Patent No.: US 6,268,877 B1
(45) Date of Patent: *Jul. 31, 2001

(54) SCANNING OPTICAL DEVICE FEATURING OPTICAL SYSTEM IMAGE MAGNIFICATIONS IN MAIN AND SUBSCANNING DIRECTIONS WITHIN A PRESCRIBED RANGE

(75) Inventors: Hiroshi Sato, Kawasaki; Kazumi Kimura, Toda; Takeshi Yamawaki, Tokyo, all of (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/965,529

(22) Filed: Nov. 6, 1997

(30) Foreign Application Priority Data

Nov. 13, 1996 (JP) .................................................. 8-317009

(51) Int. Cl.$^7$ .................................................. B41J 15/14
(52) U.S. Cl. .................................................. 347/241; 347/256
(58) Field of Search .................................................. 347/233, 238, 347/243, 241, 240, 256, 244, 258; 372/101

(56) References Cited

U.S. PATENT DOCUMENTS

| | | | |
|---|---|---|---|
| 4,393,387 | * 7/1983 | Kitamura | 347/240 |
| 5,233,367 | 8/1993 | Curry | 347/243 |
| 5,526,166 | 6/1996 | Genovese | 359/204 |

FOREIGN PATENT DOCUMENTS

| | | |
|---|---|---|
| 0715197 | 6/1996 | (EP) . |
| 2069176 | 8/1981 | (GB) . |

* cited by examiner

*Primary Examiner*—N. Le
*Assistant Examiner*—Hai C. Pham
(74) *Attorney, Agent, or Firm*—Fitzpatrick, Cella, Harper & Scinto

(57) ABSTRACT

A scanning optical device includes a light source having a plurality of light emitting points, a deflector for deflecting a plurality of light beams emitted from the light source, and an optical system for guiding the plurality of light beams emitted from the light source onto a surface to be scanned. In the scanning optical device, a predetermined condition is satisfied among a light emitting interval between the plurality of light emitting points, a tilt angle of the plurality of light emitting points, juxtaposed in the main scanning direction, and inclined in the sub scanning direction about the optical axis as the center, the beam interval of the plurality of light beams on the surface to be scanned, and imaging magnifications of the optical system in the main and sub scanning directions.

12 Claims, 4 Drawing Sheets

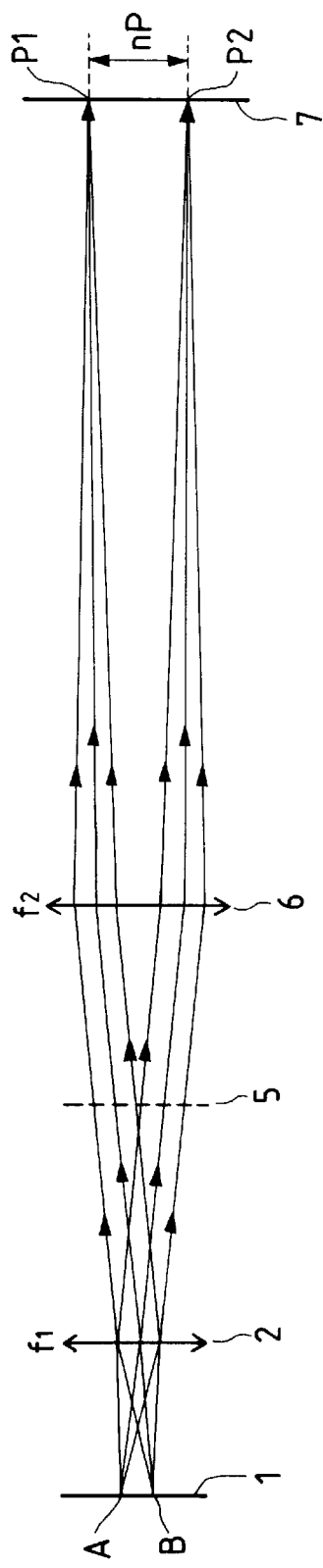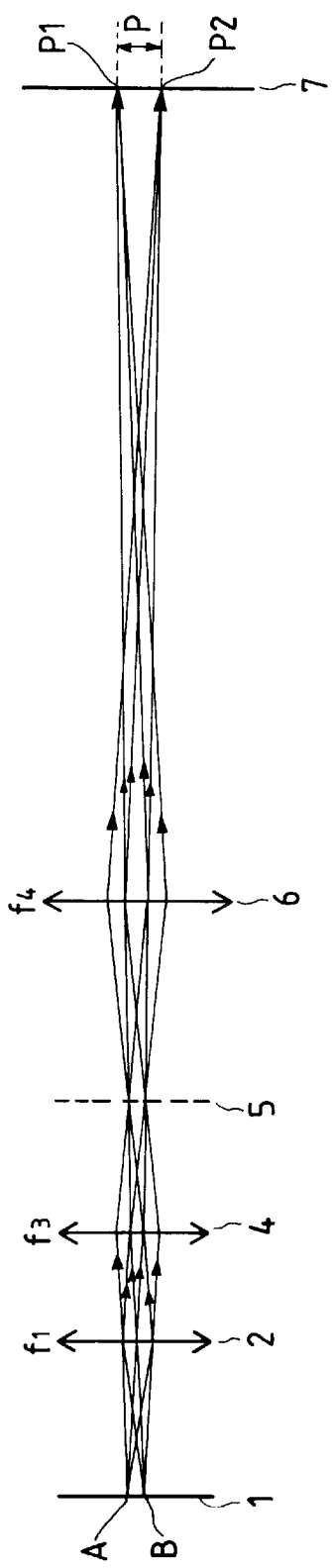

SCANNING OPTICAL DEVICE FEATURING OPTICAL SYSTEM IMAGE MAGNIFICATIONS IN MAIN AND SUBSCANNING DIRECTIONS WITHIN A PRESCRIBED RANGE

BACKGROUND OF THE INVENTION

1. Field of the Invention

The present invention relates to a scanning optical device and, more particularly, to a scanning optical device suitable for image forming apparatuses such as a digital copying machine, a laser beam printer (LBP), and the like, which record image information at a desired scanning line density by appropriately setting imaging magnifications in the main and sub-scanning directions of an optical system (scanning optical system) of the device when the surface to be scanned of a photosensitive body or the like is simultaneously optically scanned using a plurality of light beams.

2. Related Background Art

In recent years, in a scanning optical device used in a digital copying machine or the like, as a method of achieving high-speed output (high-speed printing), for example, the rotation speed of a rotary polygonal mirror used in the scanning optical device is increased. However, such a method has encountered problems of temperature rise and limited rotational speed of the motor arising from high-speed rotation, and limited high-speed output due to high-speed image clocks for modulating a laser device serving as a write means.

On the other hand, as another method of achieving high-speed output, different regions (a plurality of lines) on the surface of a recording medium are simultaneously scanned using a plurality of light beams to simultaneously write image information for these lines.

FIG. 1 is a schematic view showing principal part of an optical system of such scanning optical device using a plurality of light beams, and shows the state in the main scanning section including the main scanning direction.

Referring to FIG. 1, a light source means 31 comprises a monolithic multibeam laser prepared by forming a plurality of light emitting points (laser devices) on a single substrate surface. A collimator lens 32 converts a plurality of light beams emitted by the light source means 31 into collimated light beams. An aperture stop 33 adjusts the beam sizes of beams that pass the stop 33. A cylindrical lens 34 has a predetermined refractive power in only the sub-scanning direction. Note that the collimator lens 32, aperture stop 33, cylindrical lens 34, and the like constitute an optical means (incident optical system) for guiding a plurality of light beams emitted by the light source means 31 to an optical deflector 35 as a deflection means.

The optical deflector 35 comprises a rotary polygonal mirror, which is rotated at a constant speed in the direction of an arrow A by a driving means (not shown). An f-θ lens system 36 serves as an imaging optical system, which focuses a plurality of light beams deflected and reflected by the optical deflector 35 and images them at different exposure positions on the surface of a photosensitive body 37 as the surface to be scanned.

In such scanning optical device, a plurality of light beams are optically modulated based on an image signal and are emitted by the light source means 31. These light beams are converted into substantially collimated light beams by the collimator lens 32, and their beam sizes are adjusted by the aperture stop 33. The adjusted light beams then enter the cylindrical lens 34. The cylindrical lens 34 outputs the collimated light beams intact in a main scanning section, but converges and images them as substantially linear images on a deflection surface (reflection surface) 35a of the optical deflector 35 in a sub-scanning section perpendicular to the plane of the drawing of FIG. 1. The light beams deflectively reflected by the optical deflector 35 pass through the imaging optical system 36, and form beam spots on different regions on the surface of the photosensitive body 37, thus sequentially forming (recording) image information on the surface of the photosensitive body 37 as a recording medium.

The light source means 31 in FIG. 1 comprises a monolithic multibeam laser prepared by forming a plurality of light emitting points on a single substrate surface, as described above. FIG. 2 shows the positional relationship between the light emitting points on the substrate surface (light emitting point surface) of the monolithic multibeam laser. In FIG. 2, two light emitting points A and B juxtaposed in the main scanning direction are tilted (rotated) a predetermined angle θ in the subscanning direction about an optical axis M as the center.

FIG. 2 shows an example of the monolithic multibeam laser 31 having the two light emitting points A and B, which have a light emitting interval L falling within the range from several 10 μm to several 100 μm. When the light emitting interval L between the two light emitting points A and B becomes extremely small, electrical crosstalk is produced between the two light emitting points A and B. Hence, it is a common practice to assure a light emitting interval L of about 100 μm or more.

In the scanning optical device, in order to simultaneously scan a plurality of lines on the surface 37 to be scanned using such monolithic multibeam laser 31, a line interval $R_F$ ($\beta_F \times L_F$) on the surface to be scanned is obtained by multiplying an imaging magnification $\beta_F$ of the scanning optical system in the subscanning direction by the interval $L_F$ between the two light emitting points A and B in the subscanning direction. For example, if the two light emitting points A and B are linearly aligned in the subscanning direction, the line interval $R_F$ on the surface 37 to be scanned becomes as large as about 100 μm if the imaging magnification $\beta_F$ in the subscanning direction is equal to or larger than equal magnification. For this reason, the scanning line density (resolution) in the subscanning direction cannot be set at about 400 or 600 dpi.

In order to solve the above-mentioned problem, as shown in FIG. 2, the scanning line density (resolution) in the subscanning direction is increased by arranging the two light emitting points A and B juxtaposed in the main scanning direction while being tilted by the predetermined angle θ about the optical axis M as the center and narrowing an apparent line interval $R_F$ in the subscanning direction by setting:

$$L_F = L \times \sin \theta$$

where L is the light emitting interval between the two light emitting points A and B on the substrate surface and $L_F$ is the interval between these points A and B in the subscanning direction.

However, the conventional scanning optical device does not give any consideration to the interval between the two light emitting points A and B in the main scanning direction, and the imaging magnification of the scanning optical system in the main scanning direction.

Normally, the light emitting timings for emitting a plurality of light beams in the main scanning direction can only be discretely selected. For this reason, if large errors are produced between the actual beam interval of the plurality of light beams in the main scanning direction on the surface to be scanned and the beam interval defined by the discrete light emitting timings, positional deviations of the image are generated in the main scanning direction.

SUMMARY OF THE INVENTION

It is an object of the present invention to provide a scanning optical device which can record image information at a desired scanning line density without requiring any strict control of the light emitting timings for emitting a plurality of light beams in the main scanning direction, by appropriately setting imaging magnifications $\beta_S$ and $\beta_F$ of a scanning optical system in the main and subscanning directions upon recording an image by simultaneously scanning the surface to be scanned using a plurality of light beams emitted by a light source means having a plurality of light emitting points.

A scanning optical device according to the present invention comprises:

light source means having a plurality of light emitting points;

deflection means for deflecting a plurality of light beams emitted by the light source means; and an optical system for guiding the plurality of light beams emitted by the light source means onto a surface to be scanned, wherein the device satisfies:

$$0.9 < \left(\frac{n \cdot P}{L \cdot \cos\theta}\right) / \beta_S < 1.1$$

$$0.9 < \left(\frac{P}{L \cdot \sin\theta}\right) / \beta_F < 1.1$$

(where n is a positive integer) where L is the light emitting interval between the plurality of light emitting points, $\theta$ is the tilt angle of the plurality of light emitting points, juxtaposed in the main scanning direction, and inclined in the sub scanning direction about the optical axis as the center, P is the beam interval of the plurality of light beams in the subscanning direction on the surface to be scanned, and $\beta_S$ and $\beta_F$ are respectively the imaging magnifications of the optical system in the main and subscanning directions.

Especially, the light source means has a feature that the plurality of light emitting points on a single substrate surface.

BRIEF DESCRIPTION OF THE DRAWINGS

FIGS. 3A and 3B are schematic views showing principal part of the refractive power layouts of the first embodiment of a scanning optical device according to the present invention.

DETAILED DESCRIPTION OF THE PREFERRED EMBODIMENTS

Figure 1:
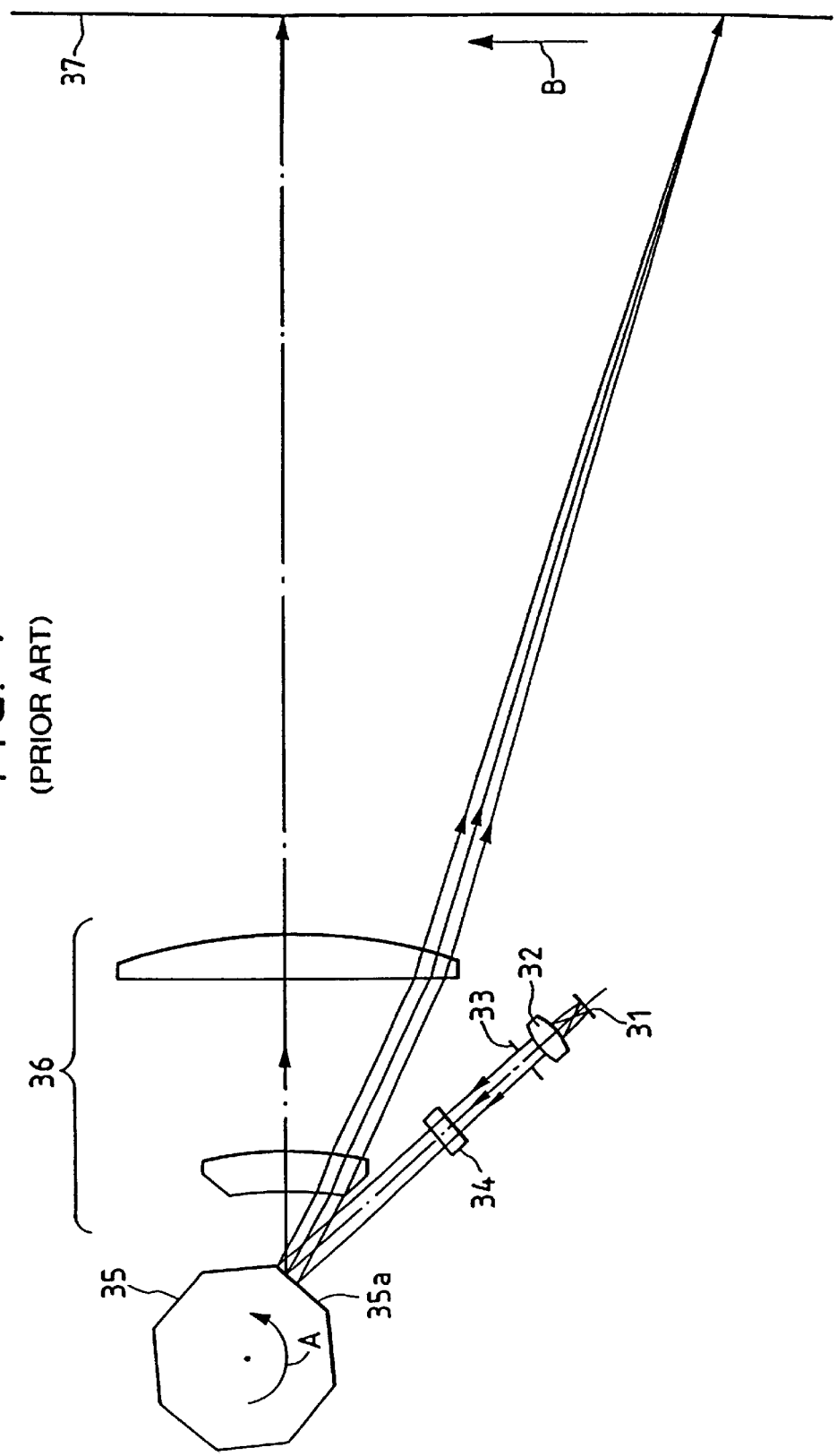
FIG. 1 is a schematic view showing principal part of an optical system of a conventional scanning optical device.
Figure 2:
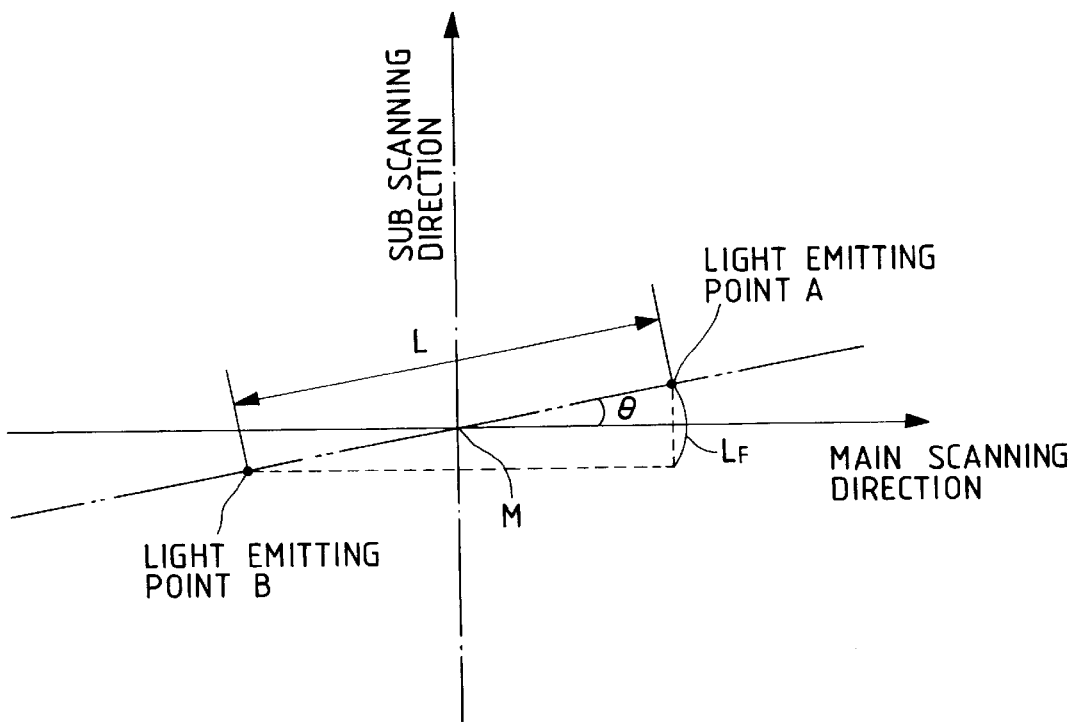
FIG. 2 is an explanatory view showing the positional relationship between a plurality of light emitting points of a light source means shown in FIG. 1.
Figure 4:
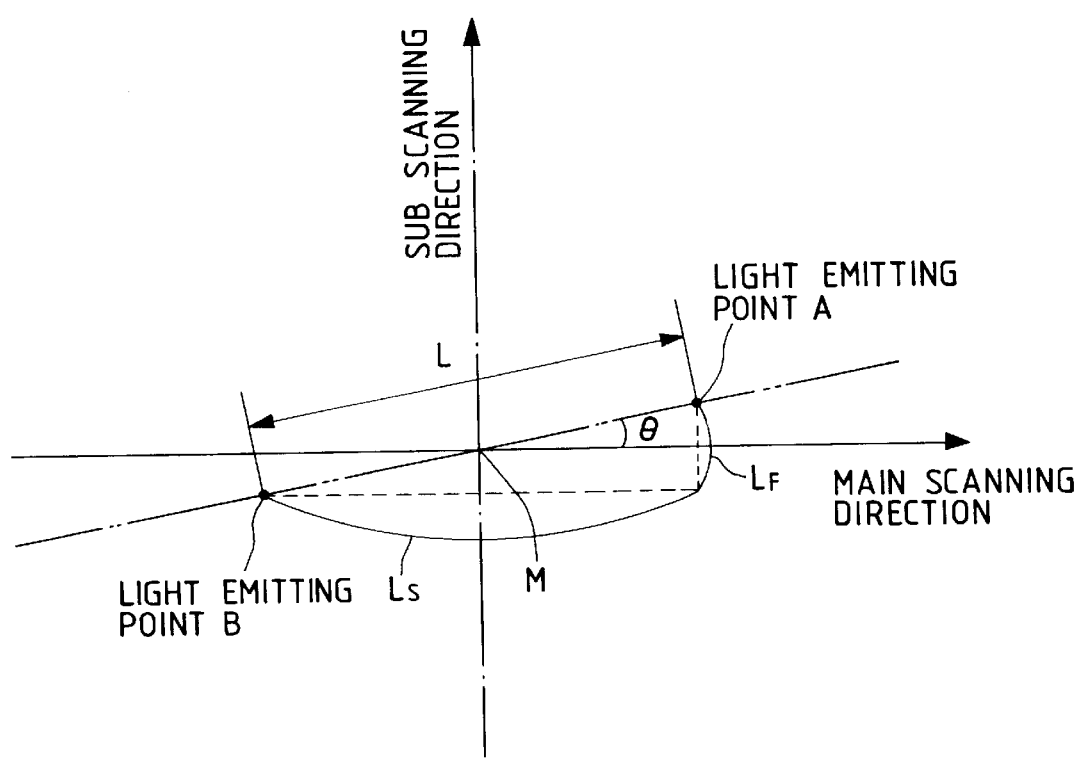
FIG. 4 is an explanatory view showing the positional relationship between a plurality of light emitting points of a light source means shown in FIGS. 3A and 3B.

FIGS. 3A and 3B are schematic views showing principal part of the refractive power layouts of the first embodiment of a scanning optical device according to the present invention. The arrangement of the overall device is the same as that shown in FIG. 1, and a detailed description thereof will be omitted. FIG. 3A shows the imaging relationship, in the main scanning direction, of a scanning optical system of the device of this embodiment, and FIG. 3B shows the imaging relationship in the subscanning direction perpendicular to the main scanning direction. FIG. 4 is an enlarged explanatory view of a light source means shown in FIGS. 3A and 3B.

Referring to FIGS. 3A and 3B and FIG. 4, a light source means 1 comprises a monolithic multibeam laser prepared by forming a plurality of light emitting points (laser devices) on a single substrate surface. In the monolithic multibeam laser 1 in this embodiment, two light emitting points A and B juxtaposed in the main scanning direction are tilted (rotated) a predetermined angle $\theta$ from the main scanning direction to the subscanning direction about an optical axis M as the center. The two light emitting points have an interval $L_F$ in the subscanning direction, and an interval $L_S$ in the main scanning direction.

A collimator lens 2 converts a plurality of light beams emitted by the light source means 1 into collimated light beams. A cylindrical lens 4 has a predetermined refractive power in only the sub-scanning direction. Note that the collimator lens 2 and the cylindrical lens 4 constitute an optical means (incident optical system) for guiding a plurality of light beams emitted by the light source means 1 to an optical deflector 5 as a deflection means (to be described below).

The optical deflector 5 comprises a rotary polygonal mirror, which is rotated at a constant speed by a driving means (not shown). An f-$\theta$ lens system 6 serves as an imaging optical system, which focuses a plurality of light beams deflectively reflected by the optical deflector 5 and images them at different exposure positions P1 and P2 on the surface of a photosensitive member (recording medium) 7 as the surface to be scanned.

In this embodiment, a plurality of light beams are optically modulated based on an image signal and are emitted by the light source means 1. These light beams are converted into substantially collimated light beams by the collimator lens 2, and the collimated light beams enter the cylindrical lens 4. The cylindrical lens 4 directly outputs the collimated light beams in a main scanning section including the main scanning direction, but converges and images them as substantially linear images on the deflection surface (reflection surface) of the optical deflector 5 in a subscanning section including the sub-scanning direction. The plurality of light beams deflectively reflected by the optical deflector 5 pass through the f-$\theta$ lens system 6, and form beam spots on different regions P1 and P2 of the surface of the photosensitive member 7, thus sequentially forming (recording) image information on the surface of the photosensitive member 7.

An imaging magnification $\beta_S$ of the scanning optical system in the main scanning direction is given by:

$$\beta_S = f_2/f_1$$

where $f_1$ is the focal length of the collimator lens 2, and $f_2$ is the focal length of the f-$\theta$ lens system 6 in the main scanning direction.

On the other hand, an imaging magnification $\beta_F$ in the sub-scanning direction is given by:

$$\beta_F = \beta_{F4} \times f_3/f_1$$

where $f_1$ is the focal length of the collimator lens 2, $f_3$ is the focal length of the cylindrical lens 4, and $\beta_{f4}$ is the imaging magnification of the optical deflector 5 and the photosensitive member 7 based on the focal length, $f_4$, of the f-θ lens system 6 in the subscanning direction.

In this embodiment, the individual parameters are set so that the imaging magnifications $\beta_S$ and $\beta_F$ of the scanning optical system in the main and subscanning directions satisfy the following relationships:

$$\beta_S = \frac{n \cdot P}{L \cdot \cos\theta} \quad (1)$$

$$\beta_F = \frac{P}{L \cdot \sin\theta} \quad (2)$$

(where n is a positive integer)
where L is the light emitting interval between the two light emitting points A and B of the monolithic multibeam laser, θ is the tilt angle of the two light emitting points A and B, juxtaposed in the main scanning direction, in the subscanning direction about the optical axis M as the center, i.e., the crossing angle a line that connects the imaging positions of the two light beams emitted by the two light-emitting points A and B on the surface 7 to be scanned makes with a scanning line on the surface 7 to be scanned, and P is the beam interval between the light beams in the subscanning direction on the surface 7 to be scanned (the beam interval corresponding to a desired scanning line density for imaging the light beams on the surface to be scanned).

Equations (1) and (2) above are associated with the imaging magnifications of the scanning optical system in the main and subscanning directions. When at least one of equations (1) and (2) is not satisfied, the beam interval of light beams on the surface to be scanned cannot be set at an integer multiple of the desired beam interval (pixel interval) P in the main scanning direction, or cannot be set to be equal to the desired beam interval P in the subscanning direction. As a consequence, the light emitting timings for emitting a plurality of light beams in the main scanning direction must be controlled more strictly to obtain a desired scanning line density.

Note that equations (1) and (2) need not be always satisfied strictly. For example, if the following conditional formulas (3) and (4) are satisfied, the object of the present invention can be practically achieved:

$$0.9 < \left(\frac{n \cdot P}{L \cdot \cos\theta}\right) \bigg/ \beta_S < 1.1 \quad (3)$$

$$0.9 < \left(\frac{P}{L \cdot \sin\theta}\right) \bigg/ \beta_F < 1.1 \quad (4)$$

(for n is a positive integer)
The f-θ lens system as the imaging means in this embodiment includes a combination of, e.g., a toric lens or cylindrical lens and a spherical lens, which can independently set powers in the main and sub scanning directions, so that the imaging magnifications $\beta_S$ and $\beta_F$ in the main and subscanning directions can be independently determined. Note that an optical element or a combination of elements that can independently determine the imaging magnifications in the main and subscanning directions other than that described above can also be applied as in the first embodiment of the present invention described above.

As described above, in this embodiment, when the imaging magnifications $\beta_S$ and $\beta_F$ of the scanning optical system in the main and subscanning directions are appropriately set, the beam interval of light beams on the surface to be scanned can be set at an integer multiple of the desired beam interval (pixel interval) P in the main scanning direction, and can be set to be equal to the beam interval P in the subscanning direction. Hence, in order to obtain a desired scanning line density, the light emitting timings for emitting light beams in the main scanning direction need not be especially controlled, i.e., the light beams need only be controlled at normally selectable timings.

According to the present invention, as described above, a scanning optical device which can record image information at a desired scanning line density without requiring any strict control of the light emitting timings for emitting a plurality of light beams in the main scanning direction, by appropriately setting the imaging magnifications $\beta_S$ and $\beta_F$ of the scanning optical system in the main and subscanning directions, when image recording is done by simultaneously scanning the surface to be scanned using a plurality of light beams emitted by a light source means prepared by forming a plurality of light emitting points on a single substrate surface, can be provided.

What is claimed is:

1. A scanning optical device comprising:
   light source means having a plurality of light emitting points;
   deflection means for deflecting a plurality of light beams emitted by said light source means; and
   an optical system for guiding the plurality of light beams emitted by said light source means onto a surface to be scanned,
   wherein said device satisfies the following relationships:

$$0.9 < \left(\frac{n \cdot P}{L \cdot \cos\theta}\right) \bigg/ \beta_S < 1.1$$

$$0.9 < \left(\frac{P}{L \cdot \sin\theta}\right) \bigg/ \beta_F < 1.1$$

where n is a positive integer, where L is a light emitting interval between the plurality of light emitting points, θ is a tilt angle of the plurality of light emitting points, juxtaposed in a main scanning direction, and inclined in a subscanning direction about an optical axis as a center, P is a beam interval of the plurality of light beams in the subscanning direction on the surface to be scanned, and $\beta_S$ and $\beta_F$ are respectively imaging magnifications of said optical system in the main and subscanning directions.

2. A device according to claim 1, wherein said light source means has the plurality of light emitting points on a single substrate surface.

3. A device according to claim 1, wherein the L is an interval between two light emitting points disposed with the optical axis between, among from said plurality of light emitting points.

4. A device according to claim 1, wherein P'=n·P and wherein P' is a beam interval of the plurality of light beams in the main scanning direction on the surface to be scanned.

5. A device according to claim 1, wherein said optical system for guiding the plurality of light beams emitted by said light source means has different powers in the main and subscanning directions.

6. A device according to claim 1, wherein said optical system for guiding the plurality of light beams emitted by said light source means shows imaging magnifications $\beta_S$ and $\beta_F$ in the main and subscanning directions, respectively, which are different from each other.

7. A laser beam printer apparatus comprising:

light source means having a plurality of light emitting points;

deflection means for deflecting a plurality of light beams emitted by said light source means;

a recording medium; and an optical system for guiding the plurality of light beams emitted by said light source means onto a surface of said recording medium, wherein said apparatus satisfies the following relationships:

$$0.9 < \left(\frac{n \cdot p}{L \cdot \cos\theta}\right) \Big/ \beta_S < 1.1$$

$$0.9 < \left(\frac{P}{L \cdot \sin\theta}\right) \Big/ \beta_F < 1.1$$

where n is a positive integer, where L is a light emitting interval between the plurality of light emitting points, θ is a tilt angle of the plurality of light emitting points, juxtaposed in a main scanning direction, and inclined in a subscanning direction about an optical axis as a center, P is a beam interval of the plurality of light beams in the subscanning direction on the surface of the recording medium, and $\beta_S$ and $\beta_F$ are respectively imaging magnifications of said optical system in the main and subscanning directions.

8. An apparatus according to claim 7, wherein said light source means has the plurality of light emitting points on a single substrate surface.

9. An apparatus according to claim 7, wherein the L is an interval between two light emitting points disposed with the optical axis between, among from said plurality of light emitting points.

10. A device according to claim 7, wherein P'=n·P wherein P' is a beam interval of the plurality of light beams in the main scanning direction on the surface of the recording medium.

11. A device according to claim 7, wherein said optical system for guiding the plurality of light beams emitted by said light source means has different powers in the main and subscanning directions.

12. A device according to claim 7, wherein said optical system for guiding the plurality of light beams emitted by said light source means shows imaging magnifications $\beta_S$ and $\beta_F$ in the main and subscanning directions, respectively, which are different from each other.

* * * * *

UNITED STATES PATENT AND TRADEMARK OFFICE
CERTIFICATE OF CORRECTION

PATENT NO.     : 6,268,877 B1
DATED          : July 31, 2001
INVENTOR(S)    : Hiroshi Sato et al.

Page 1 of 1

It is certified that error appears in the above-identified patent and that said Letters Patent is hereby corrected as shown below:

<u>Title page,</u>
U.S. PATENT DOCUMENTS, insert -- 5,465,265 11/1997 Ota.......372/101 --.

<u>Column 4,</u>
Line 50, "sub-scanning" should read -- subscanning --.

<u>Column 6,</u>
Line 52, "the" should be deleted; and
Line 54, "between, among from said plurality of" should read -- between said two --.

<u>Column 8,</u>
Line 9, "between, among from said plurality of" should read -- between said two --.
Line 66, "On" should read -- on --.

Signed and Sealed this

Fifth Day of March, 2002

*Attest:*

*Attesting Officer*

JAMES E. ROGAN
*Director of the United States Patent and Trademark Office*